Patented May 19, 1953

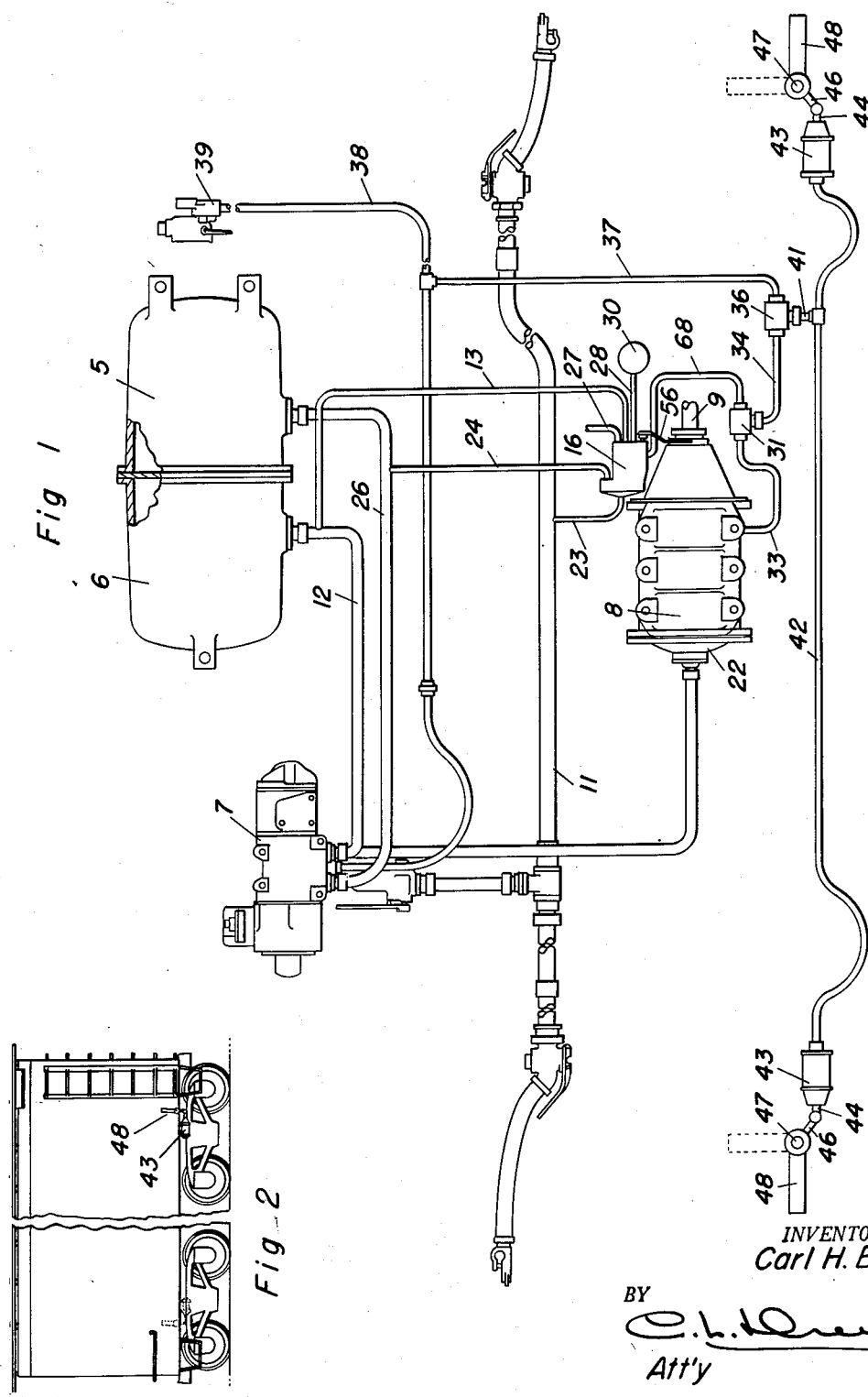

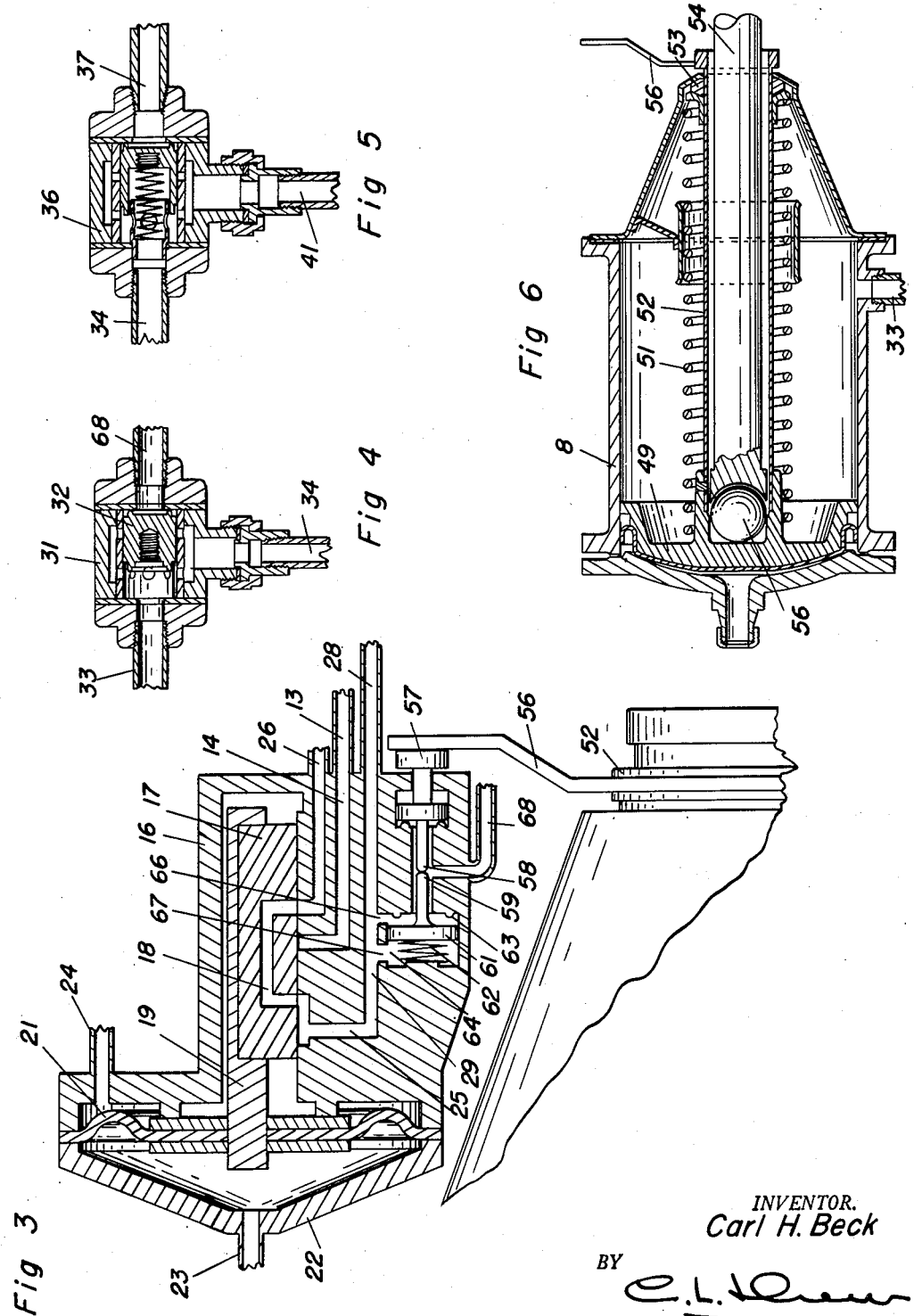

2,638,864

UNITED STATES PATENT OFFICE 2,638,864

EFFECTIVE BRAKE INDICATOR FOR RAILROAD CARS

Carl H. Beck, Los Altos, Calif.

Application April 3, 1951, Serial No. 219,098

9 Claims. (Cl. 116—55)

This invention relates to improvements in signals.

The principal object of this invention is to provide a signal for indicating whether the brakes on railroad cars are in perfect working condition.

A further object is to provide a signal means whereby a person standing beside the right of way can observe passing cars moving in either direction and instantly determine whether any of the brake systems on the individual cars are out of order and to note the number of the car so that that particular car can be serviced.

A further object is to eliminate the time delay necessary for trainmen to walk the entire length of the train in order to test each individual car brake system.

A further object is to produce a device of this character which may be attached to the standard brake equipment without materially altering its construction.

A further object is to produce a device of this character which is economical to install, one which is positive in its operation and one in which the signal must be manually returned to its operative position.

Other objects and advantages will be apparent during the course of the following description.

In the accompanying drawings forming a part of this specification and in which like numbers are employed to designate like parts throughout the same.

Fig. 1 is a diagrammatic arrangement of an ordinary brake system having my invention applied thereto;

Fig. 2 is a fragmentary side elevation of a car having my signal attached thereto;

Fig. 3 is a vertical cross section of my signal valve;

Fig. 4 is a vertical cross section of a two-way check valve;

Fig. 5 is a vertical cross section of a differential two-way check valve; and

Fig. 6 is a vertical cross section of the semaphore actuating cylinder and piston.

At the present time each railroad car is provided with a standard air brake system, a train line which serves to connect the systems of the various cars, one to the other, and in order to ascertain whether these brake systems in all the cars are functioning properly, it is necessary, and required by law, that a personal examination of each car must be made before a train departs or leaves the car yard after the train has been made up.

It is therefore necessary for the inspector to walk the entire length of the train and inspect each car to ascertain whether the air brake equipment is fully charged, which can be done either by the locomotive or by a yard charging plant, and if any car is found defective, this car must be cut out and repaired before it can proceed to its destination.

Under this procedure delays in departure may become involved, in addition to the time and expense of the air brake inspector.

I have, therefore, provided a brake indicator which will reveal at any point along the road from which the train is visible, the effectiveness or otherwise of the braking system.

Ordinarily trains moving into or out of a yard or terminal do so at low speed and under such conditions that any defective brake unit having my device attached thereto can readily be noted and the trouble remedied before departure time.

The standard air brake equipment as applied to each car consists of a brake pipe extending throughout the length of the car with angle cocks and hose at each end of the car. Through these pipes and fittings pneumatic pressure can be supplied to a double compartment reservoir, one portion 5 of which, Fig. 1, is termed the auxiliary reservoir, and the other portion 6 of which is termed the emergency reservoir, thus pre-storing energy for subsequent use.

When the air system is charged to a pre-determined minimum, this energy is available for use when it is desired to apply the brakes. The braking effort is accomplished by making a reduction in the brake pipe pressure, which, in turn, causes a valve mechanism mounted in the housing 7 to direct the pressure from the auxiliary reservoir 5 to the brake cylinder 8, and the force developed within the cylinder is in turn transmitted through the medium of a push rod 9 and a mechanical rigging to the brake shoes and wheels.

The customary brakeline pipe is shown at 11.

The structure thus far described is common to all power brake installations on railroad cars.

The result of the structure thus far shown is that when the engineer desires to make his brake application, he reduces pressure in the brake pipe 11, which, in turn, actuates valves in the housing 7, which, in turn, permits air to flow from the auxiliary reservoir 5 through suitable pipeline to the brake cylinder 8. This causes the push rod 9 to move outwardly and transmit through linkage the braking effect upon the wheels.

It often occurs that due to leakage in pipes or packing, or mechanical failure, possibly in the valves and the housing 7, the brakes on a particular car may fail to be applied and retain their effectiveness to the desired degree. There would be no way in a long train for the engineer or crew to be aware of this fact, and consequently, the entire weight of the loaded car will have to be braked by the remaining cars in the train. Should several cars in the train be defective, serious consequences might result.

In order to quickly ascertain if any of the brake equipment is defective for any cause whatsoever, I have attached to the pipe 12 leading from the emergency reservoir 6, a pipe 13 which will conduct air pressure into a bore 14 formed in the signal control housing 16, Fig. 3, within which housing is positioned a slide valve 17, having a U-shaped passage 18 formed therein, the purpose of which will be later seen.

This slide valve 17 is actuated by a push rod 19 connected to a diaphragm 21 clamped between the end of the housing 16 and a cover plate 22. The cover plate 22 has an inlet pipe 23 connected to the brake pipe 11. A pipe 24 connects to the pipe 26, which pipe in turn connects to the auxiliary reservoir 5 and to the housing 7. This pipe 24 enters the housing 16 at a point behind the diaphragm 21, the purpose of which will be later seen.

A channel 26 formed in the housing 16 connects to an exhaust pipe 27. A pipe 28 connects the bore 29 in the housing 16 to a volume reservoir 30.

I have shown in Fig. 4 a two-way check valve 31, which check valve has a sliding valve 32, one side of which valve is connected by a pipe 33 to the brake cylinder, but on the non-pressure side of the piston (see Fig. 6). The opposite side is connected by a pipe 68 to the casing 16 in a manner which will be later described.

A pipe 34 is connected to the valve 31 so as to receive air therefrom and conduct the same to a differential two-way valve 36 (see Fig. 5). A pipe 37 connects this valve to a pipe 38 which in turn extends from the housing 7 to a retaining valve 39 which retaining valve is often used and manually set so as to retain the brake cylinder pressure.

When the engineer causes a rise in brake pipe pressure by means of which to recharge the auxiliary reservoir, this rise in brake pipe pressure would normally release the brake which would be undesirable in grade operation, and the retaining valve will serve to hold the brakes under pressure.

Pipe 41 connects to a pipe 42 extending the length of the car and to opposite diagonal corners thereof. Connected to each end of pipe 41 is a cylinder 43, each of which cylinders in turn has pistons therein adapted to operate loose push rods 44 and through levers 46 to rotate about a pivot 47 a semaphore arm 48.

Referring now to Fig. 6 which is a cross section of an ordinary brake cylinder, it will be noted that within the cylinder 8 is a piston 49 which is spring loaded through the medium of a spring 51. This piston has a tubular sleeve 52 which is supported in a bearing 53 and within the sleeve there is provided a push rod 54, resting against a ball 56. It should also be noted that the push rod 54 is of less diameter than the bore of the tubular sleeve 52. This permits sidewise movement of the brake rod as it is free and moves through the necessary arc to apply the brake lever and brake gear.

Secured to the outer end of the tubular 52 is an upstanding valve actuator 56, Fig. 3, the upper end of which engages a push button 57 slidably mounted in the housing 16 and having a nose 58 adapted to engage the nose 59 of a slide valve 61 which is normally held (when brakes are applied) by a spring 62 against a circular seat 63. From within a chamber 64 ports 66 and 67 communicate between the chamber 64 and the bore 29 and on opposite sides of the valve 61.

A pipe 68 serves to conduct pressure from the chamber 64 through one side of the two-way check valve 31.

Assuming now that my device has been placed upon the railroad car and the two semaphores at the opposite corners of the car are in the full line position. Now assume that for some reason, when the engineer reduces the brake pressure in the pipe 11, the push rod 54 fails to move outwardly to apply the brakes of the car, which may be caused by several breakdowns, for instance, leakage around the piston 49 or failure of the valves in the housing 7, or leakage in the pipe lines, any one of which might cause brake failure.

As soon as this occurs, coincidental with the operation of the service portion of the housing 7, the diaphragm 21 will move toward the left of Fig. 3 due to reduced pressure on that side of the diaphragm, plus the pressure from the auxiliary reservoir upon its opposite side.

This movement of the diaphragm will cause the slide valve 17 to move from the position of Fig. 3 to a position where the U-shaped passage 18 will connect the bore 14 and the bore 25.

As soon as this occurs, air pressure will pass through the pipe 13, bore 14, U-shaped passage 18, bore 25, and some of this pressure will move into the volume reservoir 30.

At the same time, pressure will pass downwardly through the port 66, past the valve seat 63 and through the pipe 68 to the check valve 31, moving the check valve 32 from the position shown in Fig. 4 toward the left. This will uncover the ports and permit air to escape through the pipe 34 to one side of the check valve 36, which check valve will permit the air to pass therethrough into the pipe 41, pipe 42 and into the cylinders 43 at which point this air will cause the pistons to move the semaphores through their linkage to the dotted line position of Fig. 1, thus indicating to any person standing adjacent to the right of way that the brake system in this particular car has failed to function and therefore that the brake system must be repaired.

Assuming now that the engineer has reduced the pressure in the pipe 11 and that this reduction of pressure has caused the brake cylinder to function in a proper manner, the valve actuating lever 56 will be moved out of contact with the push button 57, whereupon the spring 62 will close the valve 61 against the valve seat 63, shutting off the escape of air through the pipe 68.

As a result of the closing of the valve 61, there is no escape of air into the pipe 68 and through the usual channels to the pipe 62, consequently the semaphore will not be actuated and it will be evident to the observer that the brakes upon the car are in perfect working condition.

Should the brake piston momentarily apply the brakes and then, due to leakage, return to its normal position through the action of the spring 51, this fact would be indicated by the fact that the valve actuating lever 56 will engage the push button 57, unseating the valve 61, and allowing escape of air as before described into the semaphore operating mechanism.

Should the piston in the brake cylinder travel too far, that is, beyond a pre-determined distance, which might be brought about by defect in the mechanical rigging or wear of the brake shoes, then the piston 49 will uncover the port leading to the pipe 33, thus transmitting pressure through the same to the check valve 31, pipe 34, check valve 36, to the semaphore pipe 41, thus causing the semaphore to act.

The volume reservoir 30 is merely a small storage volume tank, whereby air pressure may be conveyed therefrom, past the valve 61 and valve seat 63, to operate the semaphores, should the slide valve 17 only be moved a portion of its customary travel toward release position.

It will thus be seen that I have devised a means for signalling the failure of the brake system under all normal brake failure conditions.

On each car there is a retaining valve, the purpose of which is well known. Therefore, when the retaining valve is set at a pre-determined pressure, air is passed through the pipe 38, pipe 37, valve 36 to semaphore pipe 42, thus moving the semaphores of this car to up position, indicating that the retaining valve and its related piping is effective. This applies, also, to all cars having their retainers set up.

This will be a signal to the train crew or others that the retaining valve must be returned to its inoperative position and the semaphores returned to their down position and the end of a period that the retaining valves were in use, as for instance, at the end of a run down a grade.

It is to be understood that the form of my invention herewith shown and described is to be taken as a preferred example of the same and that various changes relative to the material, size, shape and arrangement of parts may be resorted to without departing from the spirit of the invention or the scope of the subjoined claims.

Having thus described my invention, I claim:

1. In a brake system for a railroad car, having a brake pipe line, an auxiliary air storage tank and a brake operating cylinder and piston, the combination of a warning signal, means normally responsive to a drop in pressure in said brake pipe line for operating said signal, and means operable by the movement of said piston for blocking the operation of said signal if the brake piston moves into normal brake applying position upon said drop in pressure.

2. In a brake system for a railroad car having a brake pipe line, an auxiliary air storage tank and a brake operating cylinder and piston, the combination of a fluid pressure operated warning signal, a valved pipe connecting said tank and said signal, means normally responsive to a pressure drop in said brake pipe line to open said valve and supply fluid from said tank to said signal, and means operable by the movement of said piston to shut off the fluid to said signal if the brake piston moves into normal brake applying position in response to said drop in pressure.

3. A brake system as set forth in claim 1 further including means to operate said warning signal upon excessive movement of said brake operating piston in the direction of brake application.

4. A brake system as set forth in claim 2 further including means to supply fluid pressure from said tank to said warning signal upon excessive movement of said brake operating piston in the direction of brake application.

5. In a brake system for a railroad car having a brake pipe line, an auxiliary air storage tank, a brake operating cylinder and piston, and a manually operable brake pressure retaining valve for grade operation, the combination of a fluid pressure operated warning signal, a valved pipe connecting said tank and said signal, means normally responsive to a pressure drop in said pipe line to open said valve and supply fluid to said signal, means operable by the movement of said piston to shut off the fluid to said signal if the brake piston moves into normal brake applying position, and means connecting the pressure side of said retaining valve and said signal whereby fluid will be supplied to operate said signal when said valve is closed.

6. A brake system as set forth in claim 2 further including an aperture in the wall of said cylinder at a selected point near the outer end thereof and a fluid conduit connecting said aperture to said warning signal whereby when said piston moves an excessive distance outwardly said piston will move beyond said aperture and admit brake pressure fluid to operate said warning signal.

7. In a brake system for a railroad car having a brake pipe line, an auxiliary air storage tank and a brake operating piston, the combination of a fluid pressure operated warning signal, a valved pipe connecting said storage tank and said warning signal, a piston operator for said valve positioned in a casing and forming separate, fluid-tight chambers, the first of said chambers being connected to said brake pipe line, the second of said chambers being connected to said storage tank, a second valve between said first valve and said warning signal, and means operable by the movement of said piston to close said second valve and thereby shut off the fluid to said signal if the brake piston moves into normal brake applying position in response to said drop in pressure.

8. In a brake system for a railroad car having a brake pipe line, an auxiliary air storage tank and a brake operating cylinder and piston, the combination of a fluid pressure operated warning signal, an aperture in the wall of said cylinder adjacent its outer end and a conduit connecting said aperture and said storage tank whereby when said piston travels an excessive distance outwardly, brake operating fluid will flow through said aperture and operate said warning signal.

9. In a brake system for a railroad car having a brake pipe line, an auxiliary air storage tank, a brake operating cylinder and piston and a manually operated brake pressure retaining valve for grade operation, the combination of a fluid pressure operated warning signal and means connecting the pressure side of said retaining valve and said signal whereby fluid will be supplied to operate said signal when said valve is closed.

CARL H. BECK.

References Cited in the file of this patent

UNITED STATES PATENTS

| Number | Name | Date |
|---|---|---|
| 506,787 | Mattice | Oct. 17, 1893 |
| 645,494 | Rogers | Mar. 13, 1900 |
| 823,114 | Gerard | June 12, 1906 |
| 2,137,495 | Kershaw | Nov. 22, 1938 |